United States Patent
Sperandio et al.

[11] 3,907,602
[45] Sept. 23, 1975

[54] SELF-TIGHTENING SEALING ARRANGEMENT FOR AN ENCLOSURE SUCH AS A CASING FOR AN ELECTROCHEMICAL CELL

[75] Inventors: Francis Sperandio, Le Bouscat; Michel Guglieri, Bassens, both of France

[73] Assignee: Saft-Societe des Accumulateurs Fixes et de Traction, Romainville, France

[22] Filed: Sept. 5, 1974

[21] Appl. No.: 503,260

[30] Foreign Application Priority Data
July 12, 1974 France .............................. 74.24354

[52] U.S. Cl. .............................. 136/133; 136/135 R
[51] Int. Cl. ............................................. H01m 1/02
[58] Field of Search ............ 136/107, 111, 133, 169

[56] References Cited
UNITED STATES PATENTS

| | | | |
|---|---|---|---|
| 2,601,267 | 6/1952 | Ellis ..................................... | 136/169 |
| 2,843,650 | 7/1958 | Jacquier ............................... | 136/111 |
| 3,276,916 | 10/1966 | Pun ..................................... | 136/133 |
| 3,318,737 | 5/1967 | Watanabe et al. ..................... | 136/133 |
| 3,480,481 | 11/1969 | Gauthier et al. ..................... | 136/111 |
| 3,489,616 | 1/1970 | Fangradt et al. ..................... | 136/111 |

*Primary Examiner*—Donald L. Walton
*Attorney, Agent, or Firm*—Kenyon & Kenyon Reilly Carr & Chapin

[57] ABSTRACT

The invention concerns a self-tightening sealing arrangement for an enclosure constituted by two parts in the form of cups defining a bottom part and a lid part and the first of which is metallic and is turned down or crimped over the second. According to the invention, the second part is made of a plastic material and comprises, over its whole periphery, a lip providing in the vicinity of its rim a space located inside the enclosure. The lip is in contact with a folded back portion of the first part and co-operates with the first part to form a self-tightening seal. The arrangement is particularly applicable to the containers of electrochemical cells and provides self-tightening of the seal with increases of internal pressure in such cells.

6 Claims, 2 Drawing Figures

US Patent   Sept. 23,1975   3,907,602

SELF-TIGHTENING SEALING ARRANGEMENT FOR AN ENCLOSURE SUCH AS A CASING FOR AN ELECTROCHEMICAL CELL

BRIEF SUMMARY OF THE INVENTION

The present invention concerns a self-tightening sealing arrangement for a container intended to withstand internal pressures arising within the container. An application is found for such containers, for example, as casings for sealed electrochemical cells.

Casings consisting of two metal cups, used respectively as the bottom and as the lid, fitted into each other with a seal ring having a U-shaped cross-section inserted between them, the increase in pressure increasing the tightening of the seal and therefore tending to improve the sealing in such a way that a self-tightening seal is produced, are already known. Casings of this type are described in U.S. Pat. No. 2,843,650 to Jacquier.

In such a device, for obtaining a sealed container, use is made of three parts — a metal bottom, a lid and a seal ring, the lid being turned down onto the bottom, such turning down pressing the edge of the bottom against the lid, and the seal being located between these latter.

If a simpler structure of such casings is required, by making use of only two parts for producing the sealed casing, it becomes necessary to make one of the parts of a material which may form a seal with a metal part, but which nevertheless will have sufficient rigidity for supporting the pressure resulting from the turning down of the metal part. Nevertheless, in such structure, due to this required rigidity, sealing is more difficult to obtain.

The present invention provides a particularly satisfactory solution to that problem.

It has among its objects and features a self-tightening sealing arrangement for a container constituted by two parts in the shape of cups respectively forming a bottom part and a lid part, the rim of the first part being turned down onto the second part, this turning down pressing the rim of the second part against a portion of the first part, the first part being metallic, characterized in that the second part is made of a plastic material having some elasticity and comprises on its whole periphery a lip providing in the vicinity of its rim a space inside the container, said lip then being in contact with a folded portion of the metallic part and co-operating with it to form a self-tightening seal.

In this way, when an overpressure occurs in the container, it causes the appearance of a corresponding over-pressure in the said space, this having the effect of applying the lip harder against the metal part, thus improving the sealing. This overpressure inside the space may be either to the direct communication of the said space with the inner remainder of the container, or to a reduction in the volume of said space subsequent to a deformation of the second part caused by the internal over-pressure.

The portion of the first part against which the rim of the second part is pressed may be the bottom thereof, but if the first part has a depth much greater than that of the second, it may be constituted by a fairly deep groove formed in the wall of the first part perpendicular to the bottom.

According to the embodiment providing an added advantage, a second lip is provided at the periphery of the outermost face of the bottom of the second part and the turning down or crimping of the first part is performed onto said second lip, thus giving elasticity to the compression of the second part against the first.

The invention will be better understood from the following description, given by way of an example, with reference to the accompanying drawings in which:

FIG. 1 shows a sectional view of an electrochemical cell whose casing constitutes a sealed container having the self-sealing arrangement according to the invention, and FIG. 2 shows in a partial sectional view, the portion adjacent the periphery of the lid of the cell, before its assembly in a cell.

DETAILED DESCRIPTION

Figure 1:
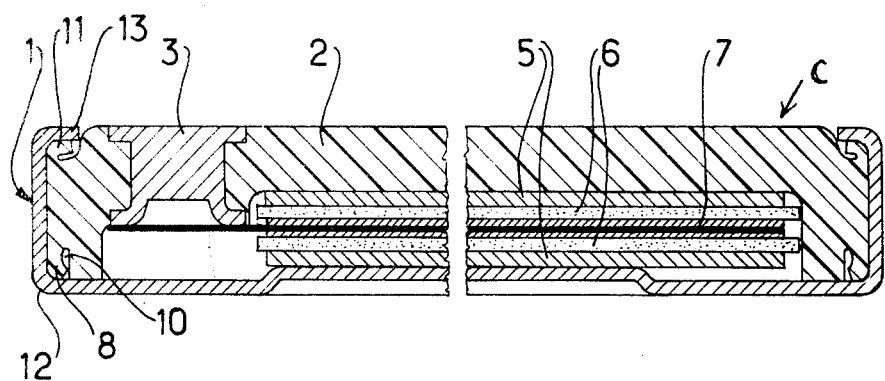

Referring to the Drawings:

In FIG. 1, reference 1 designates the cup-like metal part forming the bottom of the casing of an electrochemical cell C, said casing defining a sealed container having the self-sealing arrangement closing according to the invention. The said bottom 1 which is cup-shaped constitutes the first part referred to hereinabove. The lid part 2 made of plastic material with some elasticity, for example, a polyamide, is also of cup-like shape and constitutes the second part referred to hereinabove. The active components of the electrochemical cell are arranged inside the casing formed by the metal bottom 1 and the plastic lid 2. A positive electrode 7 is placed between two negative electrodes 5, the separators 6 imbided with electrolyte being inserted between them. The negative electrodes 5 are electrically connected together and one of them is in electrical contact with the bottom of part 1, which latter forms the negative terminal of the cell. The positive electrode 7 is assembled, for example, by welding to the rivet 3 traversing the lid part 2 in a fluid-tight manner. The rivet 3, therefore, constitutes the positive terminal of the cell.

Figure 2:
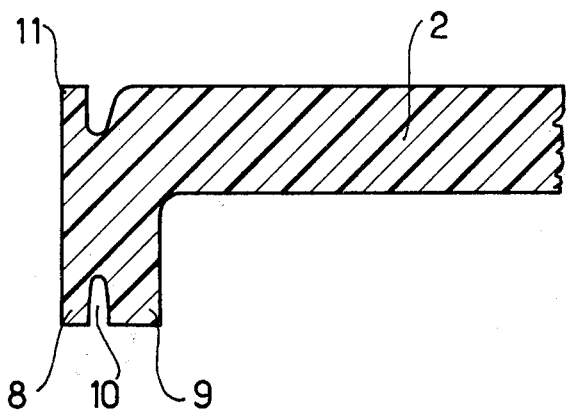

Referring now to FIG. 2, it will be observed that the peripheral rim portion of the plastic lid part 2 comprises a first lip 8 which is separated by an annular groove or space 10 from the rim portion 9 of the lid. A second lip 11 is provided in the vicinity of the upper periphery of the outermost face of lid part 2. As seen in FIG. 1, it is onto the second lip 11 that the rim portion 13 of the bottom 1 is turned down as by crimping. In FIG. 1, too, it will be observed that the lip 8 then closely engages the inside curve of the fold 12 joining the cylindrical portion of the metal bottom part 1 to its plane portion.

The result of this arrangement is as follows: The crimping which has caused the turning down of the rim 13 of the metal bottom 1 onto the lip 11 of the lid 12 presses the rim portion 9 of the lid against the plane portion of the metal bottom part 1 in an elastic manner due to the elasticity of the lip 11. A similar result which would, however, not be so good would be obtained by crimping directly the edge 13 of the bottom 1 onto the lid 2 not, however, provided with a lip 11. In either case, when the pressure increases inside the completed casing C thus formed, it increases more particularly in the space or groove 10 and tends to press the lip 8 all the more closely and tightly against the inner fold 12 of the bottom part 1. Thus, the effectiveness of the seal increases with any rise in internal cell pressure and a self-tightening seal is indeed obtained.

It need only be mentioned briefly that the preceding description would apply also if the metal bottom 1 were deeper, on the condition that the fold 12 correspond to a bearing for the edge of lip were constituted, for example, by a groove formed in the cylindrical wall of the bottom part 1. However, the invention is particularly advantageous for shallow casings. The horizontal cross-section of the casing of the cell may, moreover, have various shapes: circular, rectangular, square, oval, etc.

It is to be understood that structural variations within the scope of the appended claims are possible and are contemplated. There is no intention, therefore, of limitation to the exact structure herein described and shown.

What is claimed is:

1. Self-tightening sealing arrangement for a container constituted by two parts in the shape of cups respectively forming a bottom and a lid with the rim of the first part being turned down onto the second part, said turning down pressing rim portions of that second part against a portion of the first part, said first part being metallic, characterized in that said second part is of a plastic material and comprises on its whole periphery a lip providing, in the vicinity of its rim portion a space inside the container, said lip being in contact with a folded portion of the metal part and co-operating therewith to form a self-tightening seal when internal pressure rises within said container.

2. Self-tightening arrangement according to claim 1, characterized in that a second lip is provided on the periphery of the bottom of the second part and that said turning down of the first part is effected onto said second lip.

3. Self-tightening arrangement according to claim 1, including a conductive terminal sealingly mounted in said lid.

4. Self-tightening arrangement according to claim 1 including within said container a negative electrode in conductive contact with said metal part, a positive electrode, separator means between said electrodes and electrolyte, and a conductive terminal sealingly embedded in said lid and connected to said positive electrode, said metal part constituting the other terminal of said cell.

5. Self-tightening sealing arrangement for an electrochemical cell comprising a container constituted by two interfitted cup-shaped parts respectively forming a bottom part and a lid part with a rim portion of bottom part turned down onto the lid part and pressing a rim portion of said lid part against said bottom part, said bottom part being metallic, and said lid part being of a plastic material, a peripherally located lip at the rim portion of said bottom part providing a space between the lip and said rim portion of said lid part within said container, said lip being in contact with a folded portion of said metal bottom part and co-operating therewith to form a self-tightening seal as internal pressure within said container rises and is communicated to said space.

6. Self-tightening sealing arrangement according to claim 5 wherein said plastic material is a polyamide.

* * * * *